UNITED STATES PATENT OFFICE.

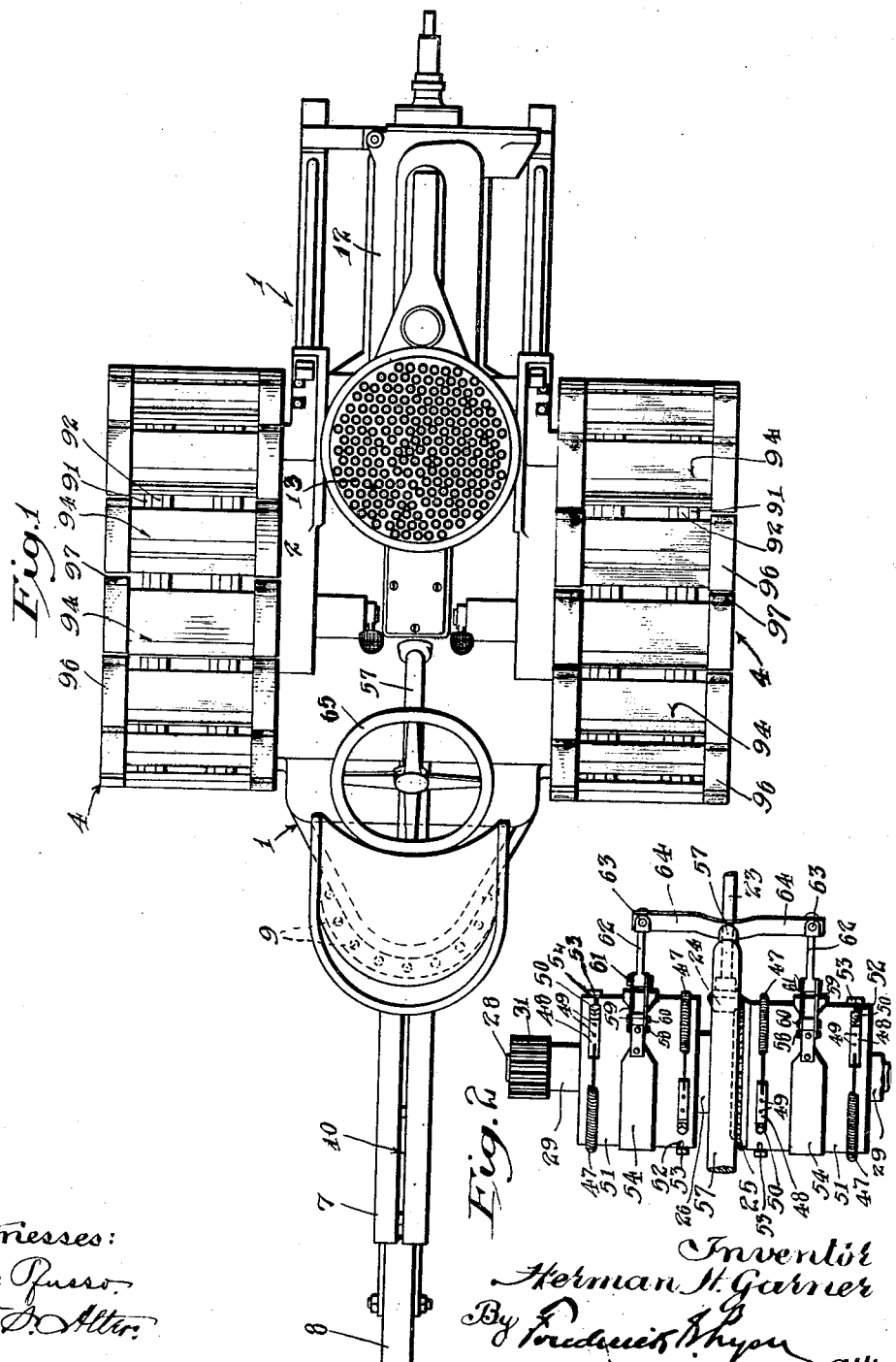

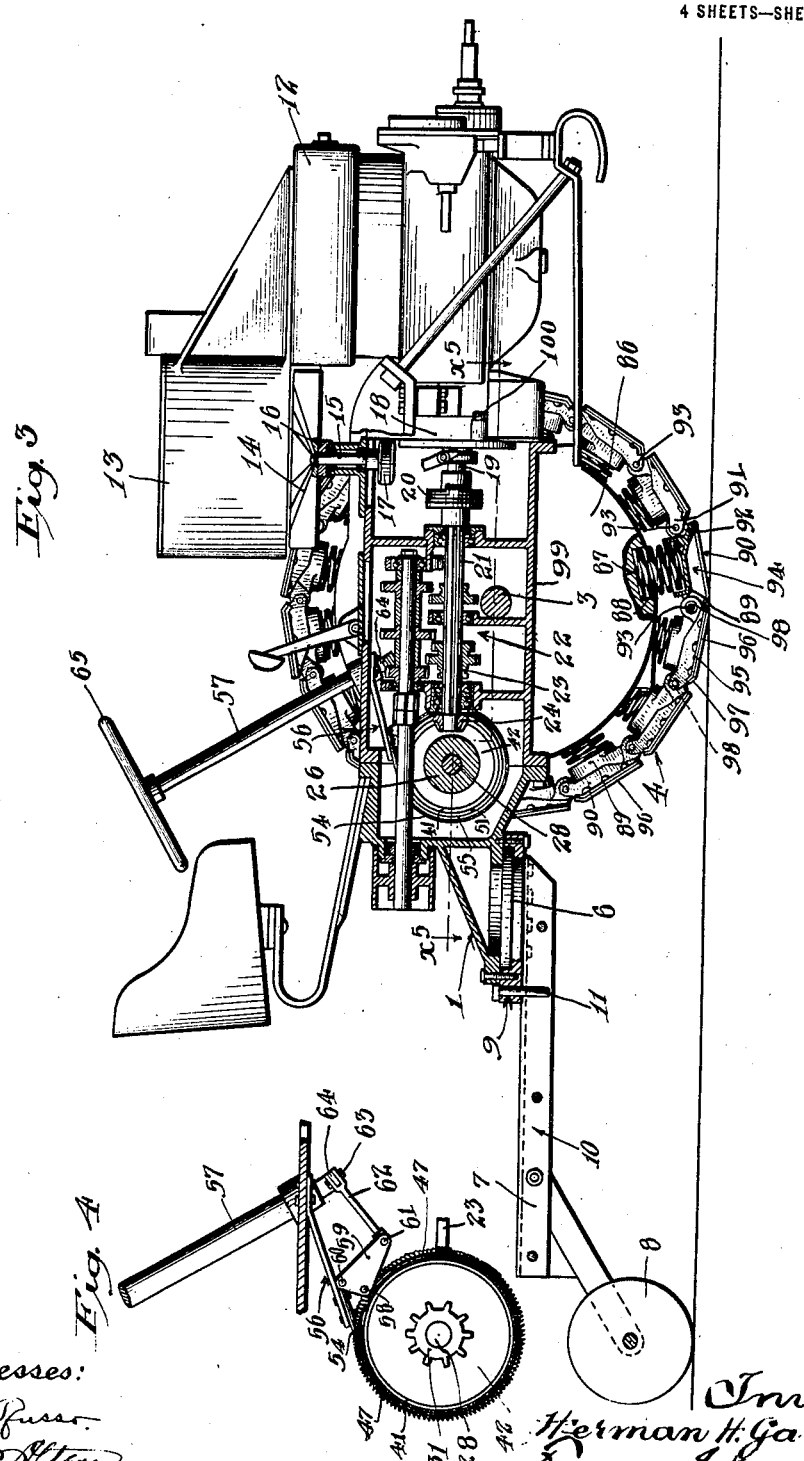

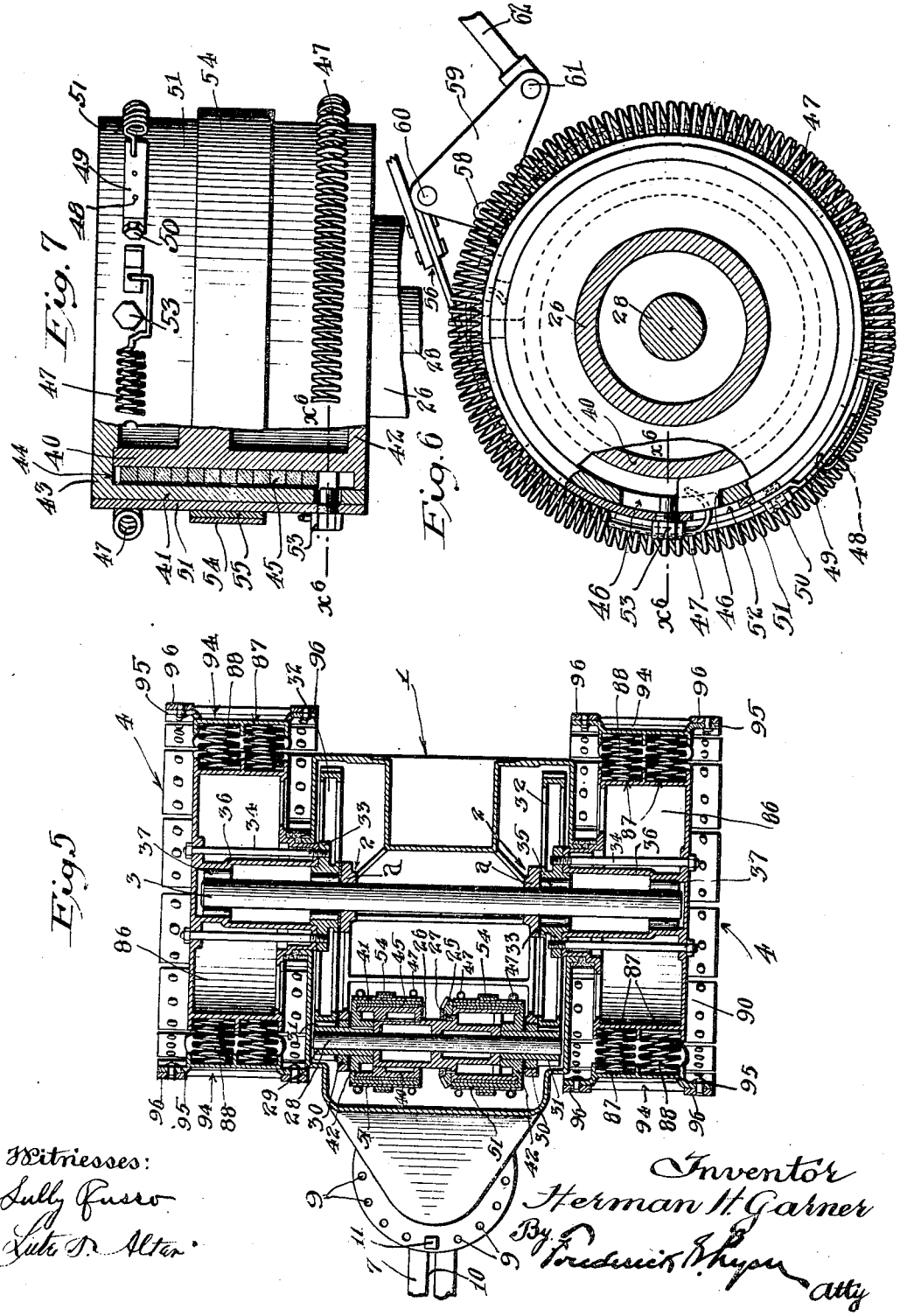

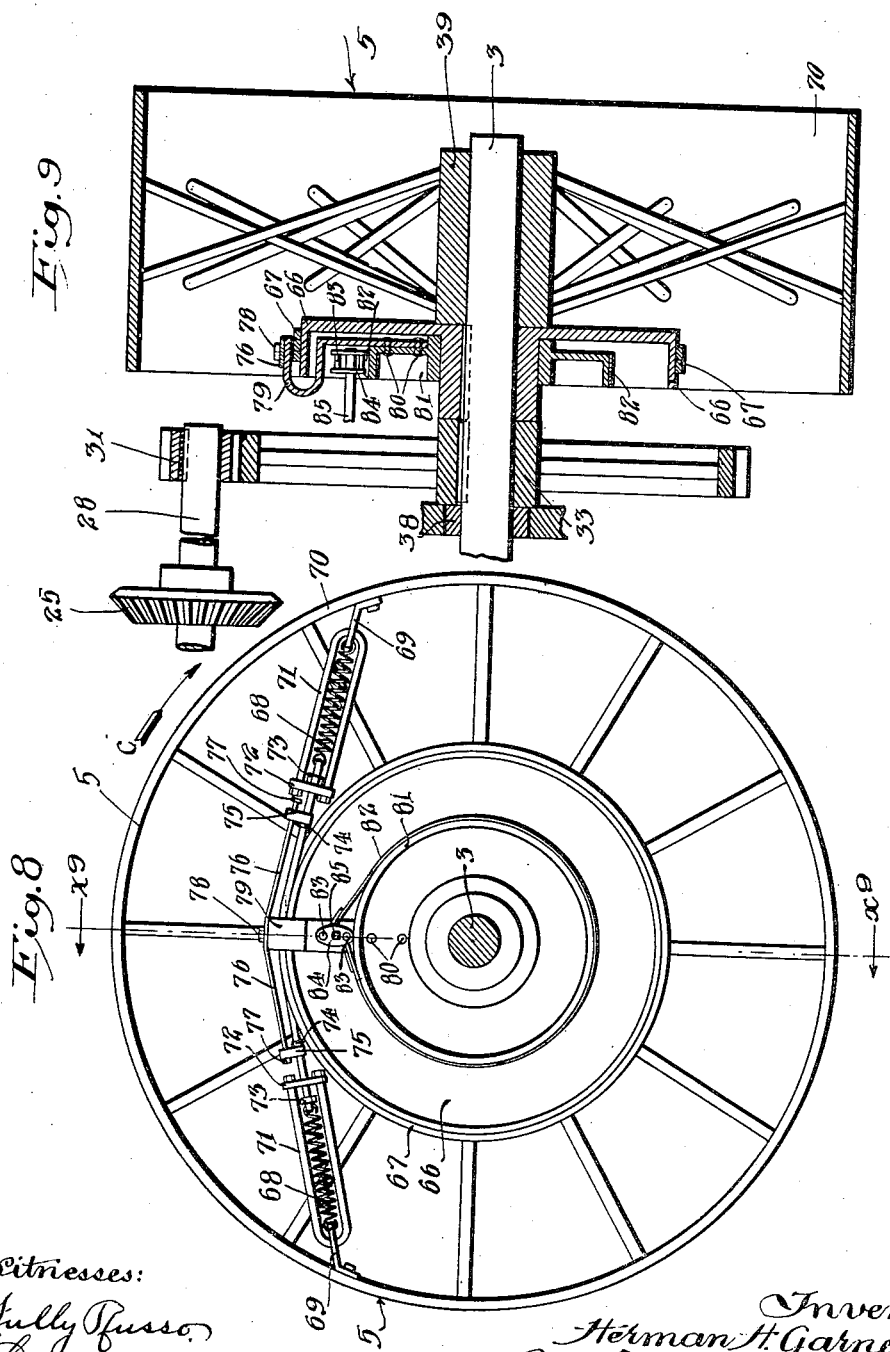

HERMAN H. GARNER, OF POMONA, CALIFORNIA.

TRACTOR.

1,283,725.   Specification of Letters Patent.   Patented Nov. 5, 1918.

Application filed October 9, 1916. Serial No. 124,460.

*To all whom it may concern:*

Be it known that I, HERMAN H. GARNER, a citizen of the United States, residing at Pomona, in the county of Los Angeles and State of California, have invented a new and useful Tractor, of which the following is a specification.

An object of this invention is to produce a tractor of maximum simplicity of construction and operation.

Another object is to produce a tractor of which the steering may be effected with maximum ease by a combined unclutching and braking action.

Another object is to produce a tractor which can be used for drawing a cultivator or the like around trees and close to the trees without striking them.

Other objects and advantages will appear in the subjoined detail description.

The accompanying drawings illustrate the invention:

Figure 1 is a plan view of a tractor embodying the invention.

Fig. 2 is a plan view of the clutch devices in Fig. 1.

Fig. 3 is a side elevation of Fig. 1, mainly in vertical mid section.

Fig. 4 is a side elevation of Fig. 2.

Fig. 5 is a plan view mainly in section on irregular line indicated by $x^5$—$x^5$, Fig. 3.

Fig. 6 is an enlarged side elevation of one of the clutch devices, portions being shown in section on line indicated by $x^6$—$x^6$, Fig. 7, for clearness of illustration.

Fig. 7 is a plan view of Fig 6, partly in section on line indicated by $x^7$—$x^7$, Fig. 6.

Fig. 8 is a side elevation of a modified form of clutch device and driving wheel, the axle being shown in section.

Fig. 9 is a section on line indicated by $x^9$—$x^9$, Fig. 8, the driving gears and portions of the frame and jack-shaft also being shown.

The tractor is provided with a main frame 1 of any suitable construction for supporting various parts hereinafter to be described and said main frame is supported at 2 on an axle 3 provided at its outer ends with drive wheels as indicated at 4, Figs. 1, 3 and 5, or as indicated at 5 in Figs. 8 and 9. The wheels 4 will be described more in detail hereinafter, the wheels 5 being substantially of a well known type.

The main frame 1 is pivoted at its rear end in the longitudinal axis thereof as indicated at 6 to a trailer frame 7 of any suitable construction provided with a trailer wheel 8, to balance and in some cases, as will be hereinafter described, to aid in steering the tractor. In order that aid in steering the tractor may be effected, the frame 1 is provided with a series of perforations 9 arranged in a circle concentric with the pivot 6, and the trailer frame 7 is provided with a slot 10 adapted to be engaged by the lower end of a pin or bolt 11 inserted in any one of the perforations 9 so as to give any desired angular relation between the frames 1 and 7.

The frame is provided at its front end with an engine 12 of any suitable type for furnishing the requisite power, the radiator 13 of said engine being cylindrical or otherwise and being disposed at the rear end of the engine and there being a horizontally arranged fan 14 beneath the radiator to suck air downward therethrough so as to aid in the cooling thereof. The fan 14 is mounted on a shaft 15 journaled at 16 on the frame 1. The shaft 15 is provided at its lower end with a friction wheel 17 driven by the fly wheel 18 of the engine.

It is clear that by the foregoing construction and arrangement of the radiator and fan the driving connections for the fan are very simple and the use of chains, belts or gears is entirely avoided.

The engine shaft 19 is provided with a clutch 20 of any suitable type not necessary to describe in detail herein as the construction of clutches is well understood. The clutch 20 effects connection and disconnection of the engine shaft 19 with the shaft 21 of a change speed device indicated in general by the character 22, said change speed device being of any well known or preferred construction. The driven shaft 23 of the change speed device is provided at its rear end with a bevel pinion 24 engaging a bevel gear 25.

In Figs. 3 and 5 the gear 25 is mounted on a hub 26 and is fastened to said hub by suitable means such as pins 27 so that when the clutch 20 is in, the hub 26 will be driven. The hub 26 is fast on a jack-shaft 28 having rotatively mounted thereon sleeves or collars 29 which are journaled at 30 in the frame 1. The collars 29 are provided and may be formed integral with pinions 31 which are fixed to the collars and which engage gears 32 having their hubs 33 fastened by bolts 34 or equivalent to the drive wheels 4. The hubs 33 are journaled at 35 on the axle 3 which is fixed to the frame at $a$ and the hubs 36 of the wheels are journaled at 37 on said axle.

In the modified form shown in Figs. 8 and 9 the gear hub 33 is fixed to the axle 3 which is journaled at 38 to the frame, the hub 39 of the wheel 5 being loose on the axle 3 that is journaled at 38 to the frame 1. In this modified form the bevel gear 25 is mounted directly on the jack-shaft 28 and the pinion 31 is fast on said jack-shaft.

Again referring to Figs. 1 to 7 inclusive, the sleeves 29 are thrown into and out of operative relation with the shaft 28 by suitable clutch devices constructed in the instance shown in the drawings as follows: The driven member or hub 26 is provided with drums 40 spaced apart from and inside of intermediate drums 41 which are fixed to the sleeves 29 respectively. The drums 40 form heads 42 at the inner ends of the clutch devices and the drums 41 form heads 43 at the outer ends of the clutch devices, the heads 43 being provided with annular grooves 44 to receive the adjacent edges of the inner drums.

Between the drums 40, 41 are disposed helical bands 45 having their ends projecting radially outward through slots 46 in the intermediate drums 41. Connected to the ends of the helical bands 45 are coil springs 47 hooked at one end through any one of a series of perforations 48 in links 49 fastened by screws 50 or equivalent to outer drums or casings 51 surrounding the intermediate drums 41. The springs 47 are arranged so that the tension thereof tends to normally tighten the helical bands 45 onto the inner drums 40, and said springs are made of any strength desired for producing friction between the helical bands 45 and inner drums, is being understood that the greater the torque of the inner drums the greater will be the tendency of the bands 45 to tightly hug said drums.

The ends of the springs 47 fastened to the helical bands 45 each passes through any one of a series of slots 52 in the outer drums 51 and said outer drums are provided adjacent said slots with abutments in the form of screws 53 which project into the slots 46 in the path of travel of the ends of the helical bands for the purpose which will be made clear hereinafter.

Surrounding the outer drums 51 are brake bands 54 which may be provided with linings 55 of suitable material as is the usual construction with brake bands, one end of each brake band being fixed at 56 to the frame 1 and the opposite end of said brake band being connected to a steering column 57 by any suitable means, said means in the instance shown in the drawings being constructed as will now be described.

Said opposite end of each brake band 54 is pivoted at 58 to a lever 59 which is fulcrumed at 60 to the frame and which is pivoted at 61 to a link 62. The link 62 is pivoted at 63 to an arm 64 of the steering column 57, and, as shown in the drawings, the arms 64 for operating both clutch devices may be oppositely arranged and integral with one another if desired.

It is now clear that turning of the steering column 57 in one direction will tighten one of the brake bands 54 and in the opposite direction will tighten the other brake band; and it is clear that if the outer drums 51 are rotating, the outer drum of the clutch device of which the brake band 54 is operated to release will be slowed up so that in reality it will rotate in a reverse direction relative to the intermediate drum 41 thus causing one of the abutments 53 to engage and push against the appropriate end of the helical band 45 so as to expand said band and release the inner drum 40 and therefore no longer transmit driving power from the inner drum to the intermediate drum. If now a definite braking action on the wheel 4 is desired, it is obvious that said braking action may be obtained by turning the steering column to a further extent in the same direction as before so as to increase the friction of the brake band 54 on the drum 51, the retarding action thus produced being transmitted through the appropriate abutment 53 to the intermediate band 41, thence through its pinion 31 and gear 32 to the wheel 4 that is connected with the clutch device in which the braking action is being produced.

In practice, to operate the form of the invention shown in Figs. 1 to 7, assuming that the engine 12 is in operation, that the clutch 20 is out, and that both brake bands 54 are released, the driver of the tractor having attached to the trailer frame 7 whatever implement or vehicle he desires to use will throw the clutch 20 in and will operate the change speed device 22 in the customary manner to drive the tractor forward or backward at the desired speed. Assuming that the tractor is being driven forward and that the driver desires to turn to the right and that the trailer frame 7 is free to swing, he will turn the steering wheel 65 to the right, thereby tightening the right hand brake band 54 to throw the right hand clutch device out of commission in a manner hereinbefore described. The motive power will then be applied only to the left hand drive wheel so that the tractor will turn to the right about the right hand wheel which is the pivotal point for executing the turn.

If the driver desires to make a turn without any forward progression at all of the tractor, especially if the tractor is running on a down grade, the driver having thrown out the right hand clutch device as above described will then turn the steering wheel yet further in a right hand direction so as to produce increased friction of the right hand brake band 54 on the right hand outer drum 51. This braking action is then transmitted to the right hand wheel as explained above.

When the driver wishes to travel forward in a straight line again, he will turn the steering wheel to the left sufficiently to release the right hand brake band 54 and the tension of the right hand spring 47 will then operate to rotate the right hand outer drum 51 in the same direction as the right hand inner drum 40 so as to tighten the right inner hand helical clutch band around said inner drum, whereupon the driving power will be transmitted from said inner drum through said helical clutch band, the appropriate abutment 53, right hand intermediate drum 41, right hand sleeve 29, right hand pinion 31 and right hand gear wheel 32 to the right hand drive wheel so as to rotate said drive wheel at the same speed as the left hand drive wheel is being driven through its connections.

When the driver desires to turn the tractor to the left, he will turn the steering wheel to the left, thus operating the left hand clutch device the same as described above for operation of the right hand clutch device in making a right hand turn.

When the tractor is operating on some soils or under certain conditions it may be advisable to assist the turning of the tractor by the steering effect of the trailer wheel 8, and in that event, the driver will turn the steering wheel to cause a right or left turn and after the trailer frame 7 has assumed the desired angular relation to the main frame 1, the operator will place the pin 11 in the appropriate perforation 9 to engage the slot 10 to fix the trailer frame in said angular relation so that the trailer wheel 8 will exert a definite steering action, it being understood that ordinarily the pin 11 will not be used and the trailer frame will be allowed to swing freely to one side or the other according to the direction in which the tractor is steered.

When the trailer frame 7 is thus depended upon to steer the tractor, the driving connections will be adjusted so that the power will be applied to both wheels and when this is done the tractive effort is much greater than when the steering is effected by throwing one clutch in and the other out and allowing the trailer frame to swing free.

It is obvious that the above described device may be operated around and quite close to trees and that if cultivator teeth are connected to the trailer frame said teeth will be drawn by the tractor so as to follow quite closely the various evolutions made by the main frame of the tractor in operating in an orchard or grove.

In the modified form shown in Figs. 8 and 9, there is keyed or otherwise fastened to the axle 3 an outer drum 66 provided on its periphery with a helical clutch band 67. The opposite ends of the clutch band 67 are connected to the inner ends of coil springs 68 and the outer ends of said coil springs are connected by links 69 to the drum or rim 70 of the wheel 5. To the links 69 are connected U-bolts 71 having guides 72 through which the ends of the clutch band pass so as to hold said band in place. The guides 72 also form abutments for stops 73 on the clutch band between the springs 68 and abutments 72.

On the end portions of the clutch band 67 are also provided other stops 74 adapted to engage abutments 75 through which pass arms 76 having on their outer ends stops 77 adapted to engage the abutments 75. The arms 76 may be integral with one another as shown and are fastened by a screw 78 or equivalent to a bracket 79 which is fastened by rivets 80 or equivalent to an inner brake drum 81. The brake drum 81 is provided with a brake band 82 having its opposite ends pivoted at 83 to a link 84 which is mounted on and is rotated by a spindle 85 that is adapted to be operated by any suitable mechanism controlled by a steering column or other device under the operator's control.

In practice with the modified form of the invention shown in Figs. 8 and 9, assuming that the wheel shown is the right hand wheel and that the spindle 85 is operatively connected to the steering column 57 in Fig. 1, if the driver desires to turn the tractor to the right, he will turn the steering wheel 65 to the right as before thus tightening the brake band 82 on the drum 81, and if the wheel be traveling in a forward direction as indicated by the arrow c, Fig. 8, the drum 81 will be retarded by the friction between it and the brake band so that it will rotate in a reverse direction relative to the drum 66 thus causing, see Fig. 8, the right hand stop 77 to engage the right hand abutment 75 so as to cause said abutment to push against the right hand stop 74 and thus loosen the clutch band 67 in order that the drum 66 can freely rotate without driving the clutch band and the parts connected thereto as is readily understood. If a definite braking action on the wheel is desired, the driver will increase the tension of the brake band 82 on the drum 81 and the braking action will be transmitted from the drum 81 through the bracket 79, right hand arm 76, right hand abutment 75, right hand stop 74, a portion near the right hand end of the clutch band 67, right hand stop 73, right hand abutment 72, right hand U-bolt 71 and right hand link 69 to the wheel rim 70. It is clear from the above that the action of the clutch device shown in Figs. 8 and 9 is practically the same as the action of the clutch devices shown in Fig. 2.

The wheels 4 are constucted the same as one another and therefore the description of one will suffice for both and the construction is as follows: The main body of the wheel is in the form of a cylinder 86 having circular sockets forming spring seats 87 in which are seated coil springs 88 arranged side by side in pairs that are arranged peripherally of the body 86. The outer ends of the springs 88 of each pair are seated in circular sockets 89 of a shoe 90. Each shoe 90 is provided at one end with knuckles 91 embracing other knuckles 92 on the opposite end of the next adjacent shoe, pins 93 passing through the knuckles 91, 92 to hingedly connect them. The shoes 90 thus form a series of pivotally connected links constituting the tread of the wheel.

The shoes 90 are recessed as indicated at 94 and form flanges 95 at the sides of the recesses and said flanges 95 are provided on their outer faces with wear strips 96 which can be readily renewed when necessary or desirable. The flanges 95 and the wear strips 96 are preferably turned inward to form a bevel 97 at the rear ends of the shoes so that when the shoes are traveling over the supporting surface the rear end of each shoe will gradually take the pressure from the forward end of the next adjacent shoe.

It is noted that the perforations 98 in the knuckles 92 are somewhat larger in diameter than the pins passing therethrough and the reason for this is that by such construction if an obstruction such as a stone gets under one side of the shoe said shoe can tilt sidewise or transversely relative to the plane of rotation of the wheel. It is thus clear that the shoes 90 are so mounted as to be movable universally which is quite important in a wheel of this type whereof the tread is of comparatively great width and the character of the surface over which it generally operates is exceptionally rough and irregular.

It is noted that the rear ends of the recesses 94 are open and that the front ends thereof extend aslant forward from the bottoms of said recesses. By this construction when the wheel is operating on soft ground, the ground will fill into the cup-like recesses as the shoes rotate and the forward slanting ends of the recesses as the shoes rotate will grip the earth more or less after the fashion of shoes on a horse grip the earth, thus insuring maximum tractive effort of the wheel. The earth will not as readily cake and stick in the recesses because of said recesses being open at the rear ends.

In practice when the wheel 4 is traveling over a comparatively hard smooth surface the wear strips 96 will engage said surface and, owing to the surface being comparatively good for tractive effort, the area offered by the wear strips 96 is sufficient for traction purposes; but when the wheel is traveling over a yielding uneven surface, such as plowed or unplowed land, the entire outer faces of the shoes come into action to maximize the tractive effort, and the universal mounting of the shoes eases jolting of the tractor to a maximum degree.

The foregoing will enable those skilled in the art to which the invention pertains to make and use said invention, it being understood that the invention is only limited by the spirit and scope of the appended claims.

The frame 1 as shown in the drawings preferably forms a housing or casing 99 for the change speed devices 22, gears 24, 25, 31, 32, disk 17 and the jack shaft clutch devices shown in Figs. 1 and 5, and the axle 3 passes from side to side through said housing. The housing 99 is closed at its front end by the engine which is fastened by bolts 100 to said housing.

I claim:

1. In combination, a frame, drive wheels for the frame, brake bands, a driven shaft, means to turn the driven shaft in either direction, and means governed by loosening and tightening of the brake bands to put the driven shaft into and out of operative relation with the wheels respectively irrespective of the direction of turning of the shaft.

2. In combination, a frame, drive wheels for the frame, a driven shaft, means to turn the driven shaft in either direction, braking means, and means governed by release and application of the braking means to put the driven shaft into and out of operative relation with the wheels respectively irrespective of the direction of turning the shaft.

3. In combination, a main frame having drive wheels, the axes of said wheels being substantially midway of the length of said frame, a trailer frame pivoted to the rear end of the main frame and normally free to be swung into different angular relations with the main frame by steering of the main frame to one side or the other, a trailer wheel for said trailer frame, an engine mounted on the front end of the main frame, means to hold the main frame and trailer frame in different angular relations to each other, a steering control member mounted on the frame, and means governed by operation of the steering control member in either direction to connect one of said wheels at a time to the engine and to effect braking action for the other wheel.

4. In combination, a main frame having drive wheels, the axes of said wheels being substantially midway of the length of said frame, a trailer frame pivoted to the rear end of the main frame and normally free to be swung into different angular relations with the main frame by steering of the main frame to one side or the other, a trailer wheel for said trailer frame, an engine mounted on the front end of the main frame, means to hold the main frame and trailer frame in different angular relations to each other, a steering control member mounted on the frame, and means governed by operation of the steering control member in either direction to connect one of said wheels at a time to the engine and to simultaneously effect braking action for the other wheel.

5. In combination, a main frame having drive wheels, the axes of said wheels being substantially midway of the length of said frame, a trailer frame pivoted to the rear end of the main frame and normally free to be swung into different angular relations with the main frame by steering of the main frame to one side or the other, a trailer wheel for said trailer frame, an engine mounted on the front end of the main frame, means to hold the main frame and trailer frame in different angular relations to each other, and means operative by the engine and under the control of the operator to drive either or both of the drive wheels.

6. In combination, a frame, drive wheels for the frame, an engine mounted on the frame, drums operatively connected to the engine, clutch bands for the drums, other drums operatively connected to the drive wheels respectively, brake bands for the second named drums respectively, means to operate the brake bands, means normally tightening the clutch bands on the clutch drums, and means operative by the brake drums when the brake bands are tightened on said drums to loosen the clutch bands against the action of the clutch band tightening means.

7. In combination, a frame, drive wheels for the frame, an engine mounted on the frame, drums operatively connected to the engine, clutch bands for the drums, other drums operatively connected to the drive wheels respectively, brake bands for the second named drums respectively, means to operate the brake bands, springs connected to the opposite ends of the clutch bands and mounted to turn with the brake drums, and means operative by rotation of the brake drums when the brake bands are tightened on said drums to loosen the clutch bands against the power of the springs.

8. In combination, a frame, drive wheels for the frame, an engine mounted on the frame, drums operatively connected to the engine, clutch bands for the drums respectively, springs tending to tighten the clutch bands, other drums operatively connected to the drive wheels respectively and operative when turned in one direction to loosen said clutch bands against the power of the springs, still other drums operative to loosen the clutch bands, and brake bands for the third named drums respectively.

9. In combination, a frame, drive wheels for the frame, an engine mounted on the frame, a steering control member mounted on the frame, means governed by operation of the steering control member in either direction to connect one or the other of said wheels at a time to the engine, a trailer frame pivoted to the frame rearward of an axial line connecting the wheels, and normally free to be swung into angular relations with the first named frame by steering of the first named frame to one side or the other, and means to hold the trailer frame in different angular relations with the main frame.

10. In combination, a frame, drive wheels for the frame, an engine mounted on the frame, a steering control member mounted on the frame, and means governed by operation of the steering control member in either direction to connect one of said wheels at a time to the engine and to effect braking action for the other wheel and through said braking action to disconnect said other wheel.

11. In combination, a frame, drive wheels for the frame, an engine mounted on the frame, a steering control member mounted on the frame, and means governed by operation of the steering control member in either direction to connect one of said wheels at a time to the engine and to simultaneously effect braking action for the other wheel and through said braking action to disconnect said other wheel.

12. In combination, a frame, drive wheels for the frame, an engine mounted on the frame, a steering control member mounted on the frame, and means governed by operation of the steering control member in either direction to connect one of said wheels at a time to the engine and governed by further operation of the steering control member in the same direction to effect braking action for the other wheel and through said braking action to disconnect said other wheel.

13. In combination, a frame, drive wheels for the frame, an engine mounted on the frame, a steering control member mounted on the frame, and means governed by the steering control member to drive one of said wheels and to brake the other wheel, the braking action effecting disconnection of said other wheel.

14. In combination, a frame, an axle fixed to the frame, an engine mounted on the frame, drive wheels rotatively mounted on the axle, gear wheels fixed to the drive wheels, a jack shaft operative by the engine, pinions rotative on the jack shaft and meshing with the gear wheels, inner drums mounted to turn with the jack shaft, intermediate drums mounted to turn with the pinions, clutch bands for the inner drums connected to drive the intermediate drums, outer drums, springs connected at one end to the outer drums and at their other ends to the clutch bands, means whereby movement of the clutch bands will be transmitted to the outer drums, and means to retard the rotation of the outer drums relative to the intermediate drums.

15. In combination, a drum, a clutch band around said drum, means to drive said drum, a second drum connected to the clutch band, a third drum, springs connected with the opposite ends of the clutch band and connected with said third drum, means independent of the springs whereby rotation of the clutch band will cause rotation of the third named drum, and means to retard the rotation of the third named drum.

16. In combination, a drum, a clutch band around said drum, means to drive said drum, a second drum connected to the clutch band, a third drum, springs connected with the opposite ends of the clutch band and connected with said third drum, means independent of the springs whereby rotation of the second named drum will cause rotation of the third drum, and means to retard the rotation of the third named drum.

17. In combination, a drum, a clutch band around said drum, means to drive said drum, a second drum, a third drum, springs connected to opposite ends of the clutch band and to the third drum, abutments connected to the third drum, stops on the clutch band to engage said abutments, means to retard rotation of the third drum, other abutments, other stops on the clutch band to engage the second named abutments, and still other stops on the second drum to engage the first named abutments.

18. In combination, a drum, a second drum having slots, a clutch band for the first named drum having its ends in said slots, a third drum having slots and having abutments extending into the slots of the second drum, springs connected with the ends of the clutch band and passing through the second named slots and connected with the third named drum, and braking means for the third named drum.

19. In combination, a main frame having drive wheels, the axes of said wheels being substantially midway of the length of said frame, a trailer frame pivoted to the rear end of the main frame and free to swing into different angular relations with the main frame by steering of the main frame to one side or the other, a trailer wheel for said trailer frame, an engine mounted on the front end of the main frame, means to hold the main frame and trailer frame in different angular relations to each other, a steering control member mounted on the frame, and means governed by operation of the steering control member in either direction to connect one of said wheels at a time to the engine and governed by further operation of the steering control member in the same direction to effect braking action for the other wheel.

20. In combination, a main frame having drive wheels, the axes of said wheels being substantially midway of the length of said frame, a trailer frame pivoted to the rear end of the main frame and free to swing into different angular relations with the main frame by steering of the main frame to one side or the other, a trailer wheel for said trailer frame, an engine mounted on the front end of the main frame, means to hold the main frame and trailer frame in different angular relations to each other, a steering control member mounted on the frame, and means governed by the steering control member to drive one of said wheels and to brake the other wheel.

21. In combination, a main frame having drive wheels, the axes of said wheels being substantially midway of the length of said frame, a trailer frame pivoted to the rear end of the main frame and free to swing into different angular relations with the main frame by steering of the main frame to one side or the other, an engine mounted on the front end of the main frame, means to hold the main frame and trailer frame in different angular relations to each other, and means operative by the engine and under the control of the operator to drive either or both of the drive wheels.

22. In combination, a frame, drive wheels for the frame, a motor mounted on the frame, a transmission connecting the motor with the drive wheels, and a steering member, said transmission including clutches and brakes governed by operation of the steering member in either direction to disconnect from the motor and simultaneously effect braking action on either wheel, the braking action disconnecting the wheel receiving said braking action.

23. In combination, a frame, drive wheels for the frame, a motor mounted on the frame, a transmission connecting the motor with the drive wheels, and a steering member, said transmission including clutches and brakes controlled by operation of the steering member in either direction to disconnect and by further operation of the steering member in the same direction, to effect braking action on either wheel, the braking action disconnecting the wheel receiving said braking action.

24. In combination, a frame, drive wheels for the frame, an engine mounted on the frame, a steering control member mounted on the frame, and means governed by the steering control member to drive either of said wheels and to brake the wheel not being driven, the braking action disconnecting the wheel receiving said braking action.

25. In combination, a frame, drive wheels for the frame, an engine on the frame, means including clutches and braking devices associated therewith for connecting the engine to each of the wheels, and a single steering control member operative in one direction to throw one of the clutches out of commission and its associated braking device into commission and the other clutch into commission and its associated braking device out of commission, and operative in the opposite direction to throw said other clutch out of commission and its associated braking device into commission and the first named clutch into commission and its associated braking device out of commission, the braking action disconnecting the wheel receiving said braking action.

26. In combination, a driving clutch member, a driven clutch member to engage the driving clutch member, a third member attached to the driven clutch member and permitting limited rotation relative thereto, braking means for the third member to retard said third member and to cause relative rotation between the third member and clutch member and means whereby relative rotation between the third member and the driven clutch member disengages said driven clutch member from the driving clutch member.

27. In combination, a frame, drive wheels for the frame, a motor on the frame, separate clutches for connecting the motor to each of the drive wheels, braking means for each wheel, and means operative through application of the braking means to either wheel to release the associated clutch.

Signed at Los Angeles, California, this 2d day of October, 1916.

HERMAN H. GARNER.

Witnesses:
GEORGE H. HILES,
A. F. SCHMIDTBAUER.